United States Patent [19]
Woodford et al.

[11] 3,949,778
[45] Apr. 13, 1976

[54] PETROL DISPENSING

[75] Inventors: Peter David Woodford, Rochford; John Alan Jackson, Brentwood, both of England

[73] Assignee: Gilbarco Limited, Greensboro, N.C.

[22] Filed: Dec. 5, 1973

[21] Appl. No.: 421,748

[30] Foreign Application Priority Data
Dec. 7, 1972 United Kingdom............ 56582/72

[52] U.S. Cl. ........... 137/355.16; 285/114; 285/136; 222/529
[51] Int. Cl.².................... B67D 5/06; B65H 75/34
[58] Field of Search..... 137/355.16, 355.17, 355.23, 137/355.24, 355.25, 615; 285/114, 136; 222/527, 529, 530

[56] References Cited
UNITED STATES PATENTS

| | | | |
|---|---|---|---|
| 393,908 | 12/1888 | Jobes | 285/114 |
| 1,041,524 | 10/1912 | Snyder et al. | 222/527 X |
| 1,371,981 | 3/1921 | Rose | 285/114 X |
| 1,585,932 | 5/1926 | Madler | 285/114 |
| 1,891,670 | 12/1932 | Ernst | 285/136 |
| 2,251,340 | 8/1941 | Moore | 222/529 X |
| 2,668,557 | 2/1954 | Hoelscher | 285/114 |
| 2,748,804 | 6/1956 | Guarnaschelli | 285/114 |
| 2,804,243 | 8/1957 | Davenport | 222/527 |

*Primary Examiner*—Henry T. Klinksiek
*Attorney, Agent, or Firm*—Finnegan, Henderson, Farabow & Garrett

[57] ABSTRACT

In a petrol pump for the forecourt of a gasolene station, a support for the delivery hose and nozzle comprises a flexible and resilient arm incorporating at least one flexible petrol conduit extending longitudinally of the arm, means at one end of the arm for connecting the arm in an upright unflexed condition to a casing of the petrol pump and coupling means at the other end of the arm for connecting at least one delivery hose and establishing communication between the conduit and the hose.

3 Claims, 11 Drawing Figures

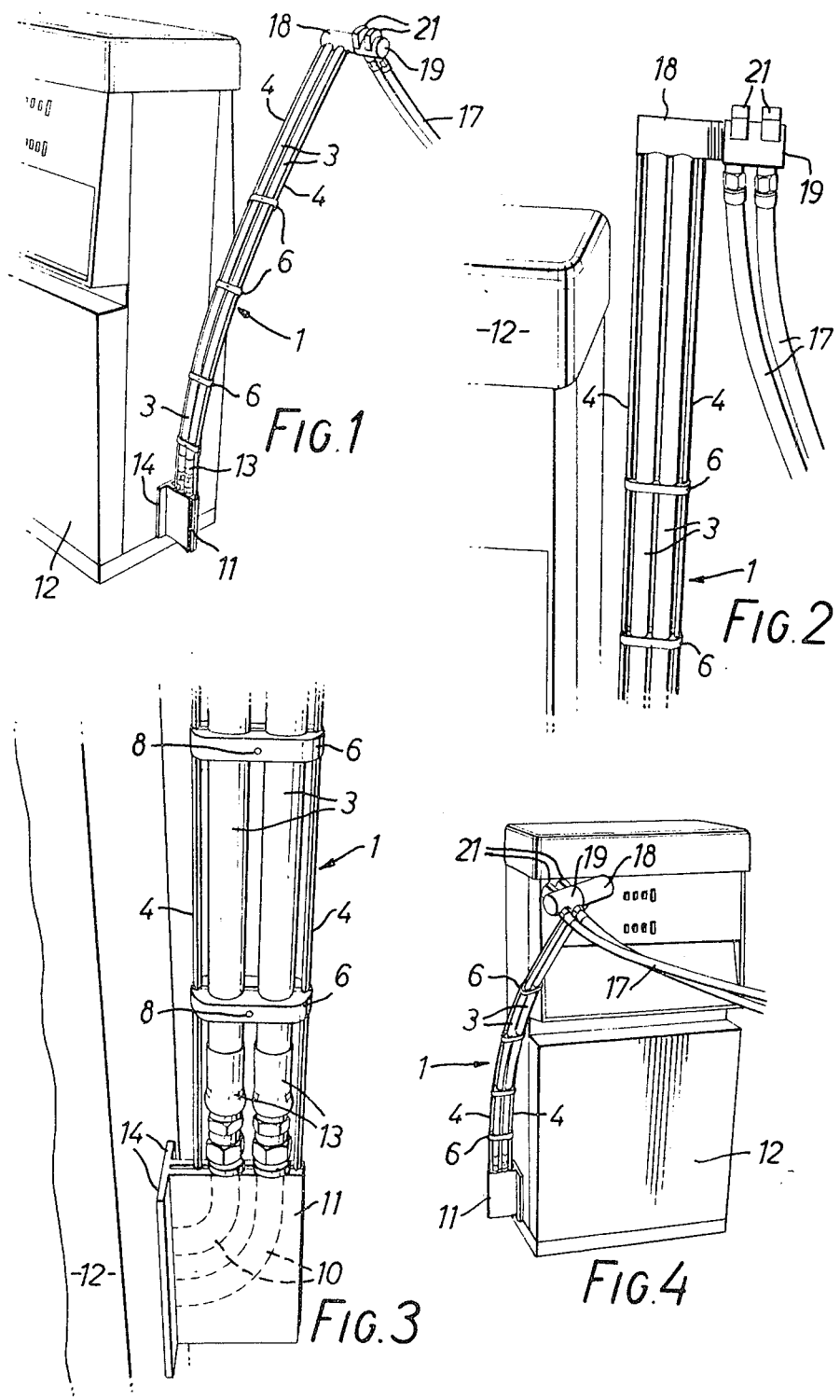

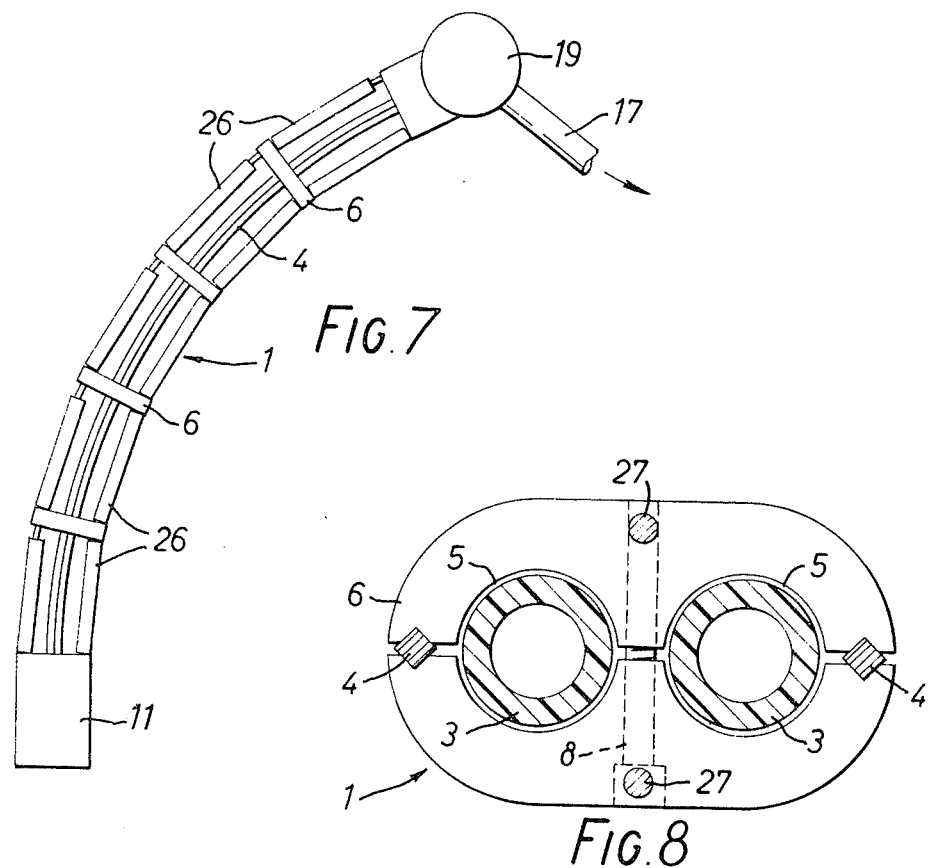
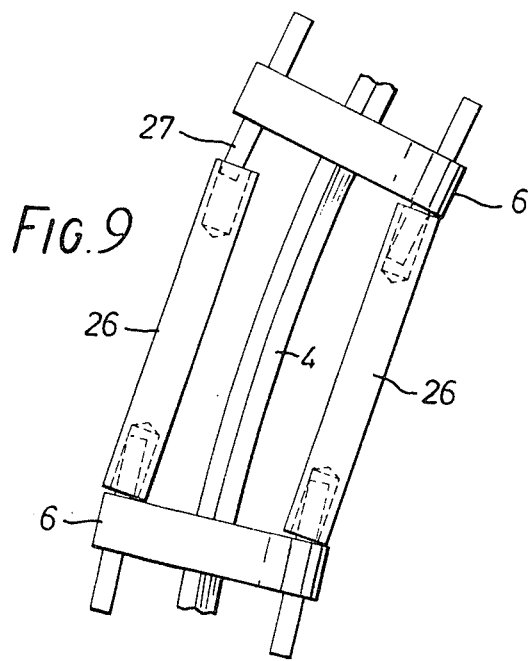

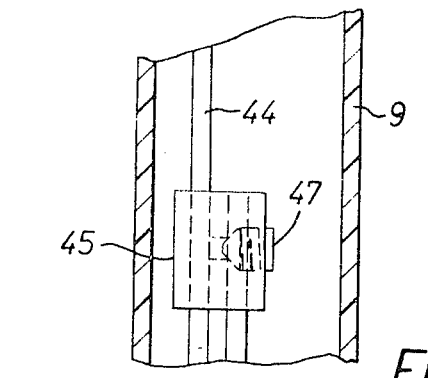
FIG. 10
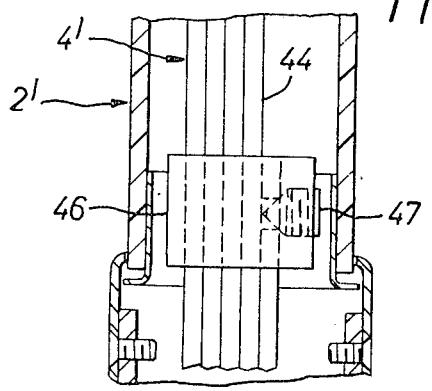
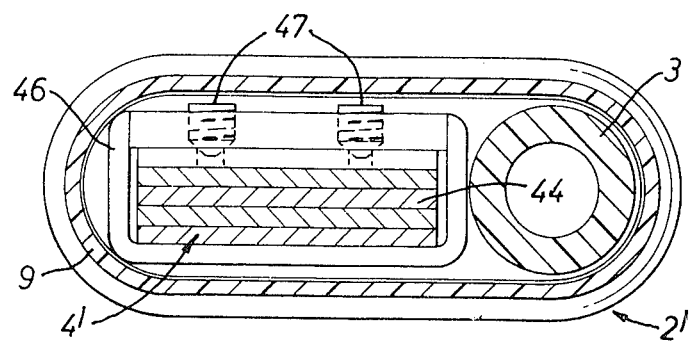
FIG. 11

PETROL DISPENSING

The invention relates to a hose support for a petrol dispensing pump of the kind that is installed on a garage forecourt, to discharge conduit assemblies comprising such a hose support and incorporating one or more delivery hoses, and to petrol pumps incorporating at least one such discharge conduit assembly.

It is conventional for one end of the delivery hose of a petrol pump to be led into a side of the pump casing for connection to fuel metering and pumping means and for the other end to carry a hand-operated nozzle. In the case of blender pumps, from which a selected one of a plurality of petrol grades or mixtures is dispensable, there are two or more parallel or concentric delivery hoses. The proximity with which an automobile must park to the pump is governed by the length of the hose or hoses. Whilst it is desirable to make provision for as long a hose reach as possible, there is a practical limit to the length of each delivery hose because it is undesirable or even prohibited to allow surplus hose lengths to lie on the oily and grimy ground; also, the longer the hose, the more cumbersome it is for the forecourt attendant to support the weight of the hose to hold it clear of the ground, this being all the more difficult if there are two hoses leading to each dispensing nozzle.

In seeking a solution to this problem, it has been suggested that a swivel arm be provided on top of the pump casing from which the delivery hose or hoses extend, the petrol being passed through the swivel arm. This has the advantage of raising the level of the input end of the hose and hence more hose length can be provided before it will sag under its filled weight and touch the ground. On the other hand, a swivel arm brings about some sealing problems for a swivel connection, and the hose is likely to obscure the quantity and price indicators on the pump casing. Further, modern petrol pump casings are capped by a computer box through which it is impractical to lead a petrol supply.

Another conduit arrangement that has been proposed is a spring-influenced delivery hose which is extended from the side of the casing as a pull is exerted on the hose from the nozzle end. This arrangement is less popular for self-service stations because of the effort involved and its maximum reach is not as long as with a swivel arm because the hose comes out of the side at the bottom of the pump casing and more readily contacts the ground. Yet another known arrangement employs a tower of about 10 foot height, from the top of which the delivery hose is suspended. Whilst the hose reach provided by this arrangement is very good, towers are unsightly and cumbersome on a garage forecourt and the petrol has to be pumped up to an unreasonable height to reach the inlet end of the delivery hose.

For at least 6 years now, various companies have unsuccessfully endeavoured to develop a conduit arrangement that is satisfactory from all points of view. We believe that we have found the answer.

According to the invention, a hose support for a petrol dispensing pump comprises a flexible and resilient arm incorporating at least one flexible petrol conduit extending longitudinally of the arm, means at one end of the arm for connecting the arm in an upright unflexed condition to a casing of the petrol pump, and coupling means at the other end of the arm for connecting at least one delivery hose and establishing communication between the conduit and the hose. Preferably, the arm has as many conduits as there are to be hoses leading from the coupling means to a dispensing nozzle and it is also preferred that the coupling means should be capable of bringing about a swivel joint between the hose or hoses and the flexible arm.

Examples of the invention are illustrated in the accompanying drawings, wherein:

FIG. 1 is a perspective view of a two-hose support attached to the side of a petrol pump casing showing the arm of the support flexed to a position away from the vertical, an external sleeve of the flexible arm being omitted to reveal the internal components;

FIG. 2 is an enlarged front elevation of the top part of the hose support and pump casing, the arm being unflexed and vertical;

FIG. 3 is an enlarged front elevation of the lower part of the casing and hose support, the arm being unflexed and vertical;

FIG. 4 is a rear perspective view of the pump and arm showing how the arm can be simultaneously flexed in two directions relatively to the pump to provide a pivoting effect;

FIG. 7 is a diagrammatic side elevation of another example of a hose support, the external sleeve being omitted from the flexible arm;

FIG. 8 is an enlarged cross-section through the FIG. 7 support;

FIG. 9 is an enlarged detail of the flexible arm used in FIG. 7;

FIG. 10 is a fragmentary part-sectional side elevation of a further embodiment for use with a single delivery hose, and FIG. 11 is a cross-section through the FIG. 10 support.

Figure 5:
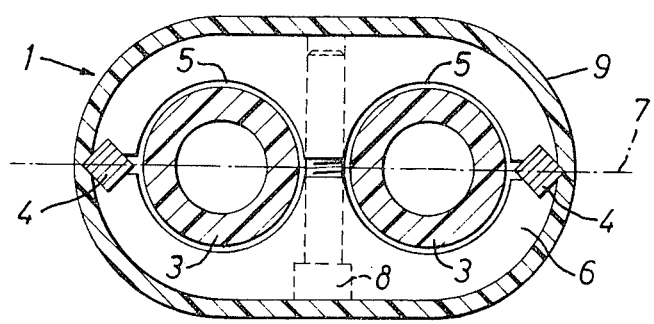
FIG. 5 is a cross-section through the hose support used in the FIGS. 1 to 4 arrangements.
Figure 6:
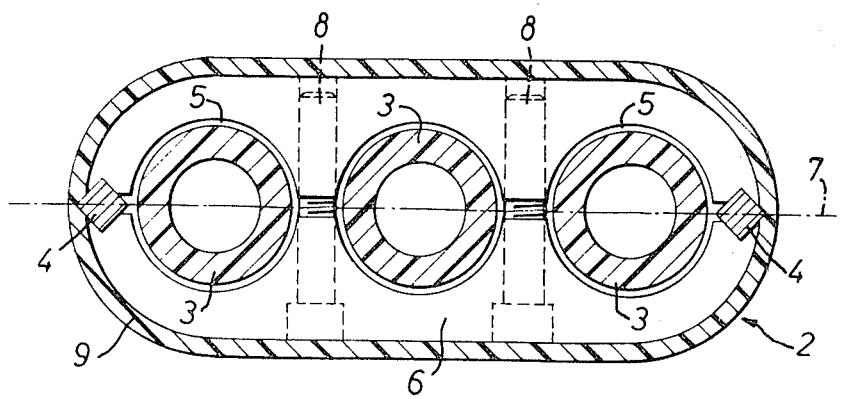
FIG. 6 is a cross-section through a hose support for use with a discharge conduit assembly comprising three delivery hoses.

The illustrated hose support comprises a flexible and resilient arm 1 (FIGS. 1–5 and 7) or 2 (FIG. 6) or 2' (FIGS. 10 and 11). The arm incorporates at least one flexible petrol conduit 3 (FIG. 11), two such conduits being employed in FIGS. 1 to 5 and 7 to 9 and three conduits in FIG. 6. The conduits 3 may be of the same rubber-like material as conventional petrol delivery hoses and, in FIGS. 1–9, are connected to two spring steel rods 4 and to each other by clamps 6. Each rod 4 is of square cross-section and arranged with one of the cross-sectional diagonals in the same plane as a plane 7 containing the longitudinal axes of the conduits 3. Other cross-sections may be employed for the rods 4, e.g. oval or circular and a composite rod 4' assembled from leaf springs will hereinafter be described with reference to FIGS. 10 and 11. Each clamp 6 is made in two segments containing recesses for locating the conduits 3 and rods 4, and the clamp is tightened by means of a connecting screw 8 (or two such screws in the case of FIG. 6). It should be noted that the clamps are a tight fit on the rods 4 in the secured condition but there is a clearance 5 between the clamp segments and the conduits 3. After an adequate number of clamps 6 has been applied at intervals along the resilient arm, the assembly of conduits 3, rods 4 and clamps 6 is sheathed in a flexible sleeve 9 (shown only in FIGS. 5, 6, 9 and 10) of rubber or plastics material which helps to hold the assembly together. It should be noted that the FIGS. 9 and 10 construction does not employ the clamps 6, the sole interconnection between the conduit 3 and spring rod 4' being in that case provided by the sleeve 9.

The hose support further comprises means in the form of a housing 11 at the lower end of the flexible arm for connecting the arm in an upright unflexed condition to the casing of a petrol pump 12. The housing may be a metal casting containing passages 10 (FIG. 3) which lead at one end to pumping and metering means within the pump casing and at the other end to nipples 13 to which the lower ends of the conduits 3 are connected. There are as many passages 10 in the housing as there are conduits 3 on the flexible arm. The housing is also equipped with any suitable means for securely supporting the rods 4, and with flanges 14 for bolting the housing to the pump casing.

At the top, the arm 1 or 2 or 2' carries a coupling member for connecting a number of delivery hoses 17 corresponding to the number of conduits provided on the flexible arm. The coupling member comprises two relatively rotatable co-axial sleeves 18, 19 of which the sleeve 18, or a mounting block therefor, is connected to the conduits 3 and rods 4 and the sleeve 19 is provided with nipples for attaching the delivery hoses 17. Internally, the coupling member is provided with a number of ports and seals enabling petrol from the conduits to be separately fed to the delivery hoses regardless of the relative rotary positions of the sleeves 18, 19. The hoses 17 terminate in a single dispensing nozzle (not shown) and in one form of the invention the flexible arm may include any suitable means (replacing the hitherto conventional channel provided in the pump casing) for suspending the nozzle in the so-called parked position where the nozzle orifice is protected from the rain. In cases where regulations call for the provision of sight glasses, which are visible indicators for the flowing petrol, these are preferably provided on the sleeve 19 as shown at 21 in FIGS. 1, 2 and 4.

The length of the flexible arm of the hose support is preferably such that it normally projects beyond the top of the pump 12, but not excessively so. A suitable arm length may be 47 inches from the centres of the sleeves 18, 19 to the top of the housing 11. It will be evident that in this way a far better hose reach is obtainable than if the hoses 17 were connected to the pump at the location of the housing 11. Further, the hose reach is improved by reason of the flexibility of the arm (see FIGS. 1, 4 and 7). FIG. 4 also shows how the arm 1 can be twisted as well as flexed, i.e. pivoted, if the hoses 17 have to be led in front of or behind the petrol pump. If desired, a hose support of the kind described can be mounted on each of two opposed sides of a pump casing.

It has been found that, for an arm length of 47 inches, the extent of flexure obtainable with the flexible arms 1 or 2 or 2' of FIGS. 1 to 6 can be as much as 20 inches (as measured by the displacement of the top of the arm from the vertical). This is entirely adequate. However, with such flexures, the rods 4 are stressed almost to their limits, after which some permanent deformation or damage might occur to the rod material. To avoid possible mis-use, it may therefore be desirable to provide means for limiting flexure of the arm.

Such means may comprise spacer tubes 26 (FIGS. 7 and 9) located loosely between adjacent clamps 6 and between the lowermost clamp and the housing 11 over locating pins 27 provided on the clamp segments and the housing mid-way between the rods 4. There are two such tubes between each pair of clamps 6 and they are shorter than the spacing between the clamps. In this way the portions of the rods 4 disposed between the clamps can be flexed before the tubes come to abut against the clamps (see especially FIG. 9).

Thus, when the arm 1 is flexed in the direction shown in FIG. 7, the right-hand lowermost spacer tube 26 will eventually limit flexure of the lowermost arm portion when it touches the lowermost clamp and the housing. Of course the tube length is chosen to prevent flexure of the lowermost arm portion beyond the safe stress limits of the materials involved. Upon further bending of the arm 1, the next higher right-hand tube 26 will contact the clamps when the next higher arm portion has been flexed to the allowable maximum extent, and so on. Maximum bending of the arm is obtained when all the right-hand spacer tubes are compressed between the clamps. On flexing the arm in the opposite direction to that shown in FIG. 7, the left-hand spacer tubes would restrict the extent of flexure. In this way, the maximum bending stress can be evenly distributed throughout the length of the spring steel rods 4.

In the FIGS. 10, 11 embodiment, the means for limiting flexure of the arm 2' are inherent in the construction employed for the composite resilient rod 4'. The rod is composed of a packet of leaf springs 44 of different lengths. These springs are coterminous at the bottom end and terminate at different elevations, until just a single leaf spring extends to the coupling member (not shown). The springs are interconnected at intervals by clamping brackets such as 45 and 46 held in place by grub screws 47. It will be evident that the arm 4' can be flexed in either of two directions from the vertical, maximum deflection occurring in the single leaf spring at the top of the arm.

We claim:

1. A petrol dispensing pump having a casing, pumping means in said casing, an upright hose support including at least one flexible petrol conduit section anchored to said pump in fluid communication and at least one resilient and flexible arm attached to and extending longitudinally of said conduit section to maintain said conduit section in a normal vertical position, at least one fluid delivery hose connected at one end thereof to the uppermost termination of said petrol conduit section by means of a swivel connecting joint enabling the delivery hose to normally hang vertically downward from the uppermost termination of said conduit section.

2. The petrol dispensing pump of claim 1 in which said upright hose support comprises a fluid delivery hose associated with and supported by at least one spring steel arm.

3. The petrol dispensing pump of claim 2 including means for limiting flexure along the length of said upright hose support.

* * * * *